(12) United States Patent
Asaba

(10) Patent No.: US 9,413,919 B2
(45) Date of Patent: Aug. 9, 2016

(54) IMAGE READING DEVICE, IMAGE FORMING APPARATUS, AND IMAGE READING METHOD

(71) Applicant: Naoki Asaba, Kanagawa (JP)

(72) Inventor: Naoki Asaba, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/716,120

(22) Filed: May 19, 2015

(65) Prior Publication Data
US 2015/0341521 A1 Nov. 26, 2015

(30) Foreign Application Priority Data
May 22, 2014 (JP) .................... 2014-106468

(51) Int. Cl.
*H04N 1/04* (2006.01)
*H04N 1/028* (2006.01)
*H04N 1/00* (2006.01)

(52) U.S. Cl.
CPC ....... *H04N 1/02815* (2013.01); *H04N 1/00689* (2013.01)

(58) Field of Classification Search
CPC .................................. H04N 1/02815
USPC .................. 358/461, 488, 465, 466
See application file for complete search history.

(56) References Cited

U.S. PATENT DOCUMENTS

2008/0112017 A1* 5/2008 Nagasaka ............ H04N 1/4076
358/461
2014/0218772 A1* 8/2014 Koshimizu ......... H04N 1/00013
358/461

FOREIGN PATENT DOCUMENTS

| JP | H04-088746 | 3/1992 |
|----|------------|--------|
| JP | 2006-067179 | 3/2006 |
| JP | 2013-065973 | 4/2013 |

\* cited by examiner

*Primary Examiner* — Cheukfan Lee
(74) *Attorney, Agent, or Firm* — Oblon, McClelland, Maier & Neustadt, L.L.P

(57) ABSTRACT

An image reading device includes a white reference member, a generating unit, a representative-value storage unit, a reproducing unit, and a normalizing unit. The white reference member reflects a light emitted from a light source. The generating unit generates pseudo data on the basis of the light reflected by the white reference member with respect to each pixel area. The representative-value storage unit stores therein a representative value of each pixel area of the pseudo data. The reproducing unit reproduces the pseudo data on the basis of the representative values. The normalizing unit normalizes results of photoelectric conversion of at least any of pixels on the basis of the pseudo data, thereby creating a criterion for determining the presence or absence of an original.

13 Claims, 14 Drawing Sheets

IMAGE READING DEVICE, IMAGE FORMING APPARATUS, AND IMAGE READING METHOD

CROSS-REFERENCE TO RELATED APPLICATIONS

The present application claims priority to and incorporates by reference the entire contents of Japanese Patent Application No. 2014-106468 filed in Japan on May 22, 2014.

BACKGROUND OF THE INVENTION

1. Field of the Invention

The present invention relates to an image reading device, an image forming apparatus, and an image reading method.

2. Description of the Related Art

There is known an image reading device that detects the size of an original by pre-scanning an original area (a readable area) prior to reading of the original. Furthermore, when the image reading device reads the original, the image reading device performs a shading correction in which a white reference board is read to correct uneven illuminance, etc. of a light source thereby normalizing read original data. In the detection of the original size, a shading correction as rigorous as in the reading of the original is not required. Accordingly, to speed up the detection of the original size, there is known such a way that a shading correction is performed using previously-acquired and retained read white reference board data without reading of a white reference board.

Furthermore, due to increasing demands for power saving in recent years, there are becoming more common image reading devices equipped with an energy-saving mode function of turning off a portion of the power to an image reading device to put the image reading device into a standby state when a user does not use the image reading device for a long time. And, there are desired image reading devices capable of fast recovery from energy-saving mode.

Japanese Laid-open Patent Publication No. 2013-065973 has disclosed an image reading device that executes a shading correction using already-acquired correction data which has been stored in a correction-data storage unit in original-size detecting operation and executes a shading correction using new correction data which has been newly acquired in image reading operation.

However, such conventional technologies have a problem that the memory capacity required for original-size detecting operation is large, so it takes a long time to read data from a memory.

In view of the above-described conventional problem, there is a need provide an image reading device, image forming apparatus, and image reading method capable of improving the accuracy of detecting the original size while decreasing the storage capacity required for detection of the original size thereby reducing the readout time.

SUMMARY OF THE INVENTION

It is an object of the present invention to at least partially solve the problems in the conventional technology.

According to the present invention, there is provided an image reading device comprising: a photoelectric conversion element that includes a plurality of pixels arranged in a main scanning direction, and hotoelectrically converts a reflected light of a light emitted from a light source with respect to each pixel into an electrical signal to be treated as read data; a white reference member reflects the light emitted from the light source as a criterion for correcting a result of photoelectric conversion of each pixel; a generating unit that generates pseudo data, which is a substitute for the criterion for correcting respective results of photoelectric conversion of the plurality of pixels, on the basis of the light reflected by the white reference member with respect to each pixel area composed of the predetermined number of pixels out of the plurality of pixels; a representative-value storage unit that stores therein a representative value of each pixel area of the pseudo data generated by the generating unit; a reproducing unit that reproduces the pseudo data on the basis of the representative values stored in the representative-value storage unit; a normalizing unit that normalizes results of photoelectric conversion of at least any of pixels that have received the light reflected by the white reference member on the basis of the pseudo data reproduced by the reproducing unit, thereby creating a criterion for determining the presence or absence of an original; and a determining unit that determines the original size by detecting the presence or absence of an original at a predetermined position on the basis of the determining criterion.

The present invention also provides an image forming apparatus comprising: the above-described image reading device; and an image forming unit that forms an image read by the image reading device on a recording medium.

The present invention also provides an image reading method comprising: photoelectrically converting a reflected light of a light emitted from a light source with respect to each pixel into an electrical signal to be treated as read data by a photoelectric conversion element including a plurality of pixels arranged in a main scanning direction; generating pseudo data, which is a substitute for a criterion for correcting respective results of photoelectric conversion of the plurality of pixels, on the basis of a light reflected by a white reference member, which reflects the light emitted from the light source as a criterion for correcting a result of photoelectric conversion of each pixel, with respect to each pixel area composed of the predetermined number of pixels out of the plurality of pixels; storing a representative value of each pixel area of the generated pseudo data; reproducing the pseudo data on the basis of the stored representative values; normalizing results of photoelectric conversion of at least any of pixels that have received the light reflected by the white reference member on the basis of the reproduced pseudo data, thereby creating a criterion for determining the presence or absence of an original; and determining the original size by detecting the presence or absence of an original at a predetermined position on the basis of the determining criterion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
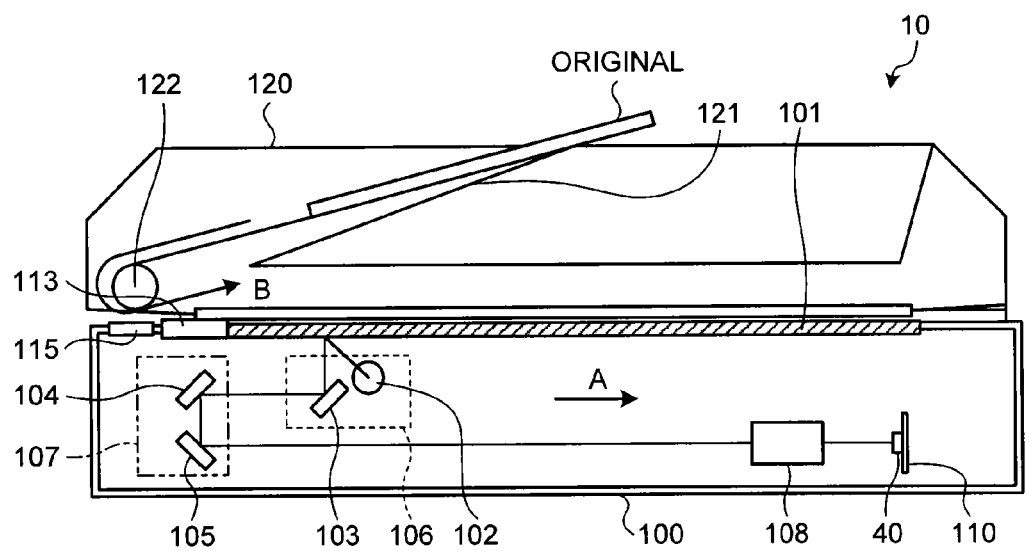
FIG. 1 is a diagram showing an outline of an image reading device according to an embodiment of the present invention.

An exemplary embodiment of an image reading device included in, for example, an image forming apparatus will be explained below with reference to accompanying drawings. FIG. 1 is a diagram showing an outline of an image reading device 10 according to the embodiment. The image reading device 10 includes a scanner 100 and an automatic document feeder (ADF) 120.

The scanner 100 illuminates an original, which is an object to be imaged, with an irradiation light from a light source 102, and a photoelectric conversion element 40, which is an image sensor, photoelectrically converts a reflected light from the original into an electrical signal to be treated as read data, thereby the scanner 100 reads image data of the original. As shown in FIG. 1, this scanner 100 includes an exposure glass 101 that an original is to be put on a top surface thereof. Furthermore, this scanner 100 includes a first carriage 106 and a second carriage 107; the first carriage 106 is composed of the light source 102 including, for example, an LED for exposure of an original and a first reflection mirror 103, and the second carriage 107 is composed of a second reflection mirror 104 and a third reflection mirror 105.

Moreover, this scanner 100 includes a lens unit 108 for bringing a light reflected by the third reflection mirror 105 to the photoelectric conversion element 40. Furthermore, this scanner 100 also includes, as criteria for correcting a result of photoelectric conversion of each pixel by the photoelectric conversion element 40 and various distortions caused by an image scanning optical system, a white reference member 113 such as a reference white board for reflecting a light emitted from the light source 102 and a sheet-through reading slit 115. The white reference member 113 can be illuminated by the light source 102, and is placed in a different position from the exposure glass 101 which is an original illuminating position and the sheet-through reading slit 115.

The photoelectric conversion element 40 is mounted on a substrate 110, and is configured to be capable of treating any reflected lights from both an original put on the exposure glass 101 or an original passing through the sheet-through reading slit 115 and the white reference member 113 as incident light.

On top of the scanner 100, the ADF 120 is mounted; a hinge etc. (not shown) is provided so that the ADF 120 can open and close against the exposure glass 101.

The ADF 120 includes an original tray 121 as an original setting table on which an original bundle composed of multiple pages of an original can be set. Furthermore, this ADF 120 includes a separation/feed means including a feed roller 122 that separates a sheet of original from an original bundle set on the original tray 121 one by one and automatically feeds the sheet toward the sheet-through reading slit 115.

When the scanner 100 scans, the first and second carriages 106 and 107 are driven to move in sub-scanning direction A by a stepping motor (not shown). Furthermore, when the image reading device 10 reads an original by sheet-through, the first and second carriages 106 and 107 move to under the sheet-through reading slit 115. Then, the image reading device 10 conveys the original set on the ADF 120 in direction B by means of the feed roller 122, thereby reading the original at the position of the sheet-through reading slit 115.

Figure 2:
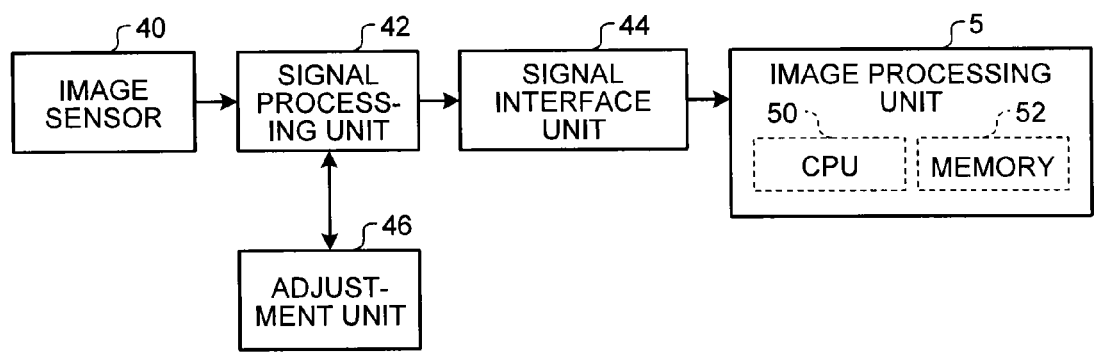
FIG. 2 is a block diagram showing functions of around a photoelectric conversion element.

FIG. 2 is a block diagram showing a hardware configuration of around the photoelectric conversion element (image sensor) 40. The photoelectric conversion element 40 includes a plurality of pixels (not shown) arranged in a main scanning direction, and photoelectrically converts a reflected light of a light emitted from a light source with respect to each pixel into an electrical signal to be treated as read data. Then, the photoelectric conversion element 40 outputs analog image data, which is a result of the photoelectric conversion, to a signal processing unit 42. The signal processing unit 42 performs signal processing, such as sample-and-hold processing, amplification, black-level correction, and A/D conversion, on the analog image data, and outputs the processed analog image data (digital image data) to a signal interface unit 44.

The signal interface unit 44 converts the digital image data to a more appropriate transmission pattern, and outputs the converted digital image data to an image processing unit 5. The image processing unit 5 has a CPU 50 and a memory 52, and performs a variety of image processing on the input digital image data. The memory 52 includes, for example, a RAM, a ROM, and a non-volatile RAM (NVRAM). Furthermore, an adjustment unit 46 makes adjustment to the processing performed by the signal processing unit 42 on the basis of a light reflected by the white reference member 113 after the power has been turned on.

Incidentally, the photoelectric conversion element 40, the signal processing unit 42, the signal interface unit 44, and the adjustment unit 46 are integrated, for example, into one chip. The image processing unit 5 is composed of, for example, hardware, and the CPU 50 executes a program. However, these components can be arbitrarily combined.

Figure 3:
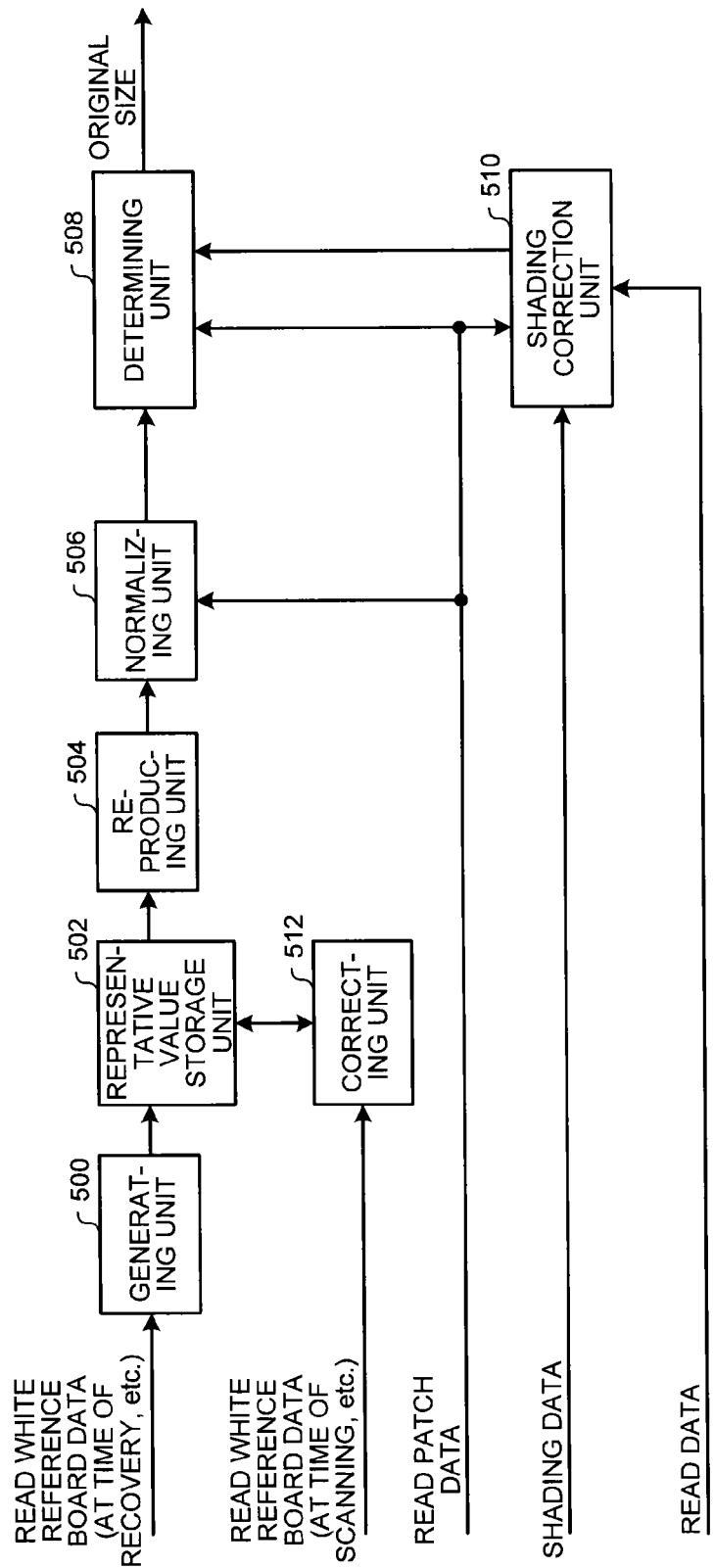
FIG. 3 is a block diagram showing functions that an image processing unit has.

FIG. 3 is a functional block diagram showing functions that the image processing unit 5 has. As shown in FIG. 3, the image processing unit 5 includes a generating unit 500, a representative-value storage unit 502, a reproducing unit 504, a normalizing unit 506, a determining unit 508, a shading correction unit 510, and a correcting unit 512.

The generating unit 500 generates pseudo data, which is a substitute for a criterion for correcting results of photoelectric conversion of a plurality of pixels by the photoelectric conversion element 40, on the basis of a light reflected by the white reference member 113 with respect to each pixel area composed of the predetermined number of pixels out of the plurality of pixels.

The representative-value storage unit 502 stores therein a representative value of each pixel area of the pseudo data generated by the generating unit 500. For example, a representative value of each pixel area of the pseudo data is the maximum value of each pixel area of the pseudo data. The representative value can be the minimum value, average value, or intermediate value of each pixel area of the pseudo data. The representative-value storage unit 502 stores the representative value in a non-volatile area (for example, an NVRAM) before the power has been turned off. The representative-value storage unit 502 can be configured to have stored therein a predetermined initial value at the beginning, such as at the time of shipment of the image reading device 10.

The reproducing unit 504 reproduces the pseudo data on the basis of the representative values stored in the representative-value storage unit 502. For example, the reproducing unit 504 reproduces the pseudo data after the power has been turned on.

The normalizing unit 506 normalizes results of photoelectric conversion of at least any of pixels that have received a light reflected by the white reference member 113 on the basis of the pseudo data reproduced by the reproducing unit 504, thereby creating a criterion for determining the presence or absence of an original.

The determining unit 508 determines the original size by detecting the presence or absence of an original at a predetermined position on the basis of the determining criterion created by the normalizing unit 506. For example, the determining unit 508 determines the original size on the basis of reflected lights from patch areas (see FIG. 10) composed of the predetermined number of pixels at predetermined one or more positions. Furthermore, when respective results of photoelectric conversion of multiple pixels with respect to a light reflected by the white reference member 113 have been stored, the determining unit 508 determines the original size on the basis of the results of photoelectric conversion of the multiple pixels instead of the determining criterion created by the normalizing unit 506.

The shading correction unit 510 performs a shading correction on read original data on the basis of a result of processing by the signal processing unit 42 after the adjustment unit 46 has made adjustment.

The correcting unit 512 corrects a representative value stored in the representative-value storage unit 502 on the basis of a result of a shading correction last performed by the shading correction unit 510. For example, the correcting unit 512 corrects a representative value to be newly stored in the representative-value storage unit 502 on the basis of the ratio of a representative value which has already been stored in the representative-value storage unit 502 to a representative value of the last read data of the white reference member 113. Furthermore, if the ratio of the two representative values is equal to or more than a predetermined value, or if the ratio of the two representative values is equal to or less than a predetermined value, the correcting unit 512 does not correct a representative value stored in the representative-value storage unit 502.

Figure 4:
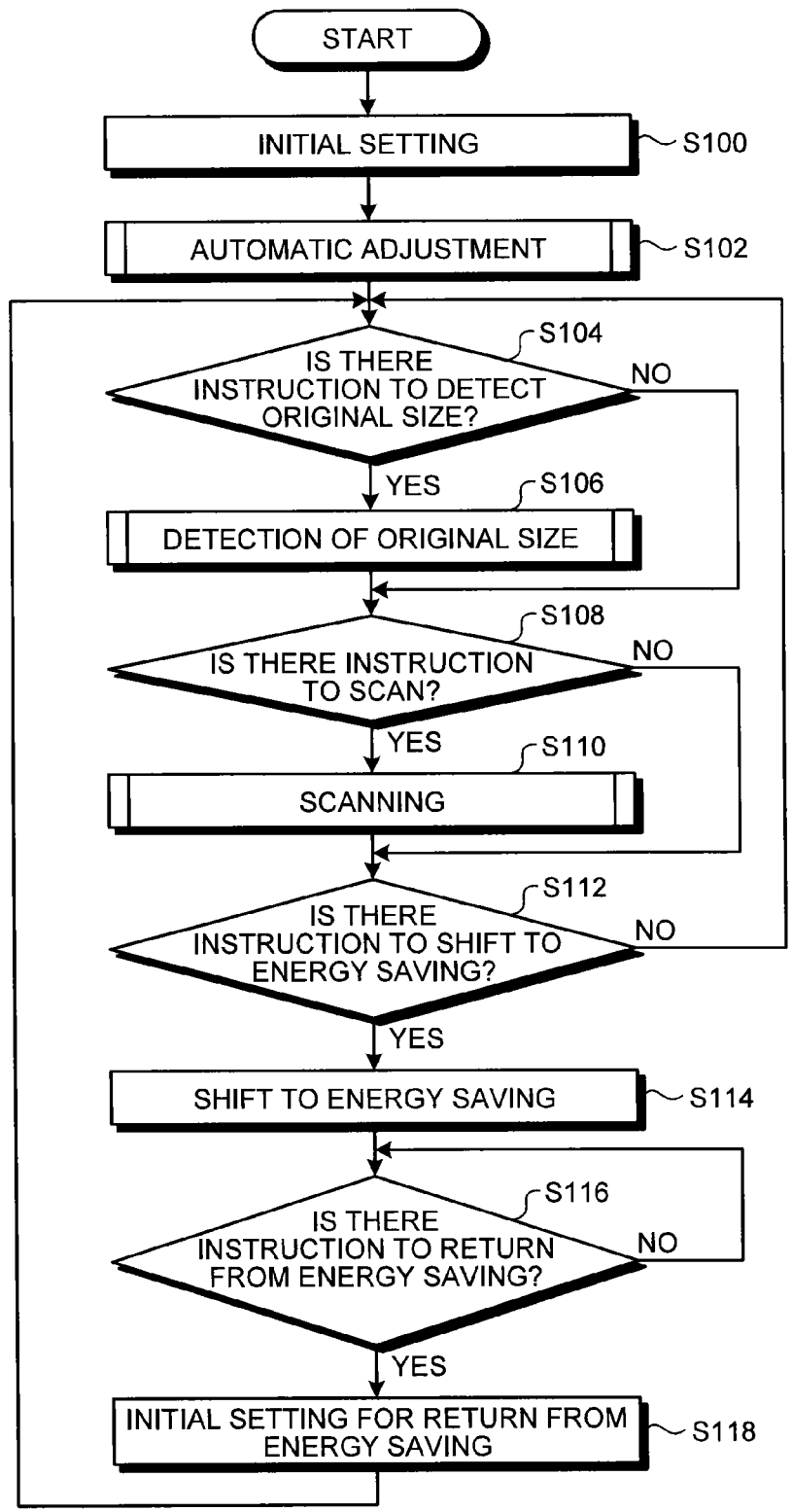
FIG. 4 is a flowchart showing the overall operation of the image reading device.

Subsequently, the operation of the image reading device 10 is discussed in detail. FIG. 4 is a flowchart showing the overall operation of the image reading device 10 from when the main power supply is turned on until a variety of processing is performed. After the main power supply has been turned on, the image reading device 10 first performs initial setting (step S100). After making automatic adjustment (step S102: see FIG. 5), the image reading device 10 goes into a standby state.

When having received an instruction to execute detection of the original size (YES at step S104), the image reading device 10 performs an original-size detecting process (step S106); when having received an instruction to execute scanning (image reading) (YES at step S108), the image reading device 10 performs scanning (step S110); when having received an instruction to shift to energy-saving mode (energy saving) (YES at step S112), the image reading device 10 shifts to the energy saving (step S114). When having received no executing instruction, the image reading device 10 is in the standby state.

Incidentally, the instruction to execute detection of the original size is issued, for example, when a sensor for detecting open/close of the ADF 120 has detected a change from open to close. The instruction to execute scanning is issued by detection of a user pressing the EXECUTE SCAN button. The instruction to shift to the energy saving is issued when a predetermined length of time has passed without any user operation or when the user has issued an instruction to shift to the energy saving.

When the image reading device 10 being in the standby state has received an instruction to return from the energy saving (YES at step S116), the image reading device 10 performs initial setting for return from the energy saving (step S118), and returns to the process at S114. On the other hand, when having received no instruction to return from the energy saving (NO at step S116), the image reading device 10 continues in the standby state.

Incidentally, the instruction to return from the energy saving is issued by detection of user operation, such as pressing of an arbitrary button, open/close of the ADF 120, or setting of an original on the ADF 120.

Figure 5:
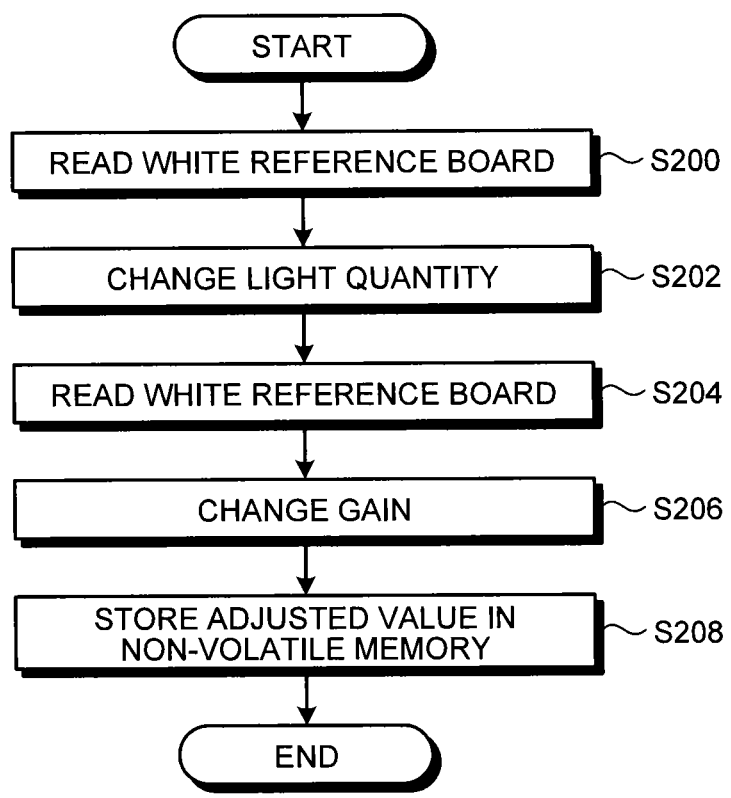
FIG. 5 is a flowchart showing a process performed as automatic adjustment by the image reading device.

FIG. 5 is a flowchart showing a process performed as the automatic adjustment by the image reading device 10. Hereinafter, the process shown in FIG. 5 may be referred to as the automatic adjustment. At the start of the automatic adjustment, the image reading device 10 first reads a white reference board (the white reference member 113) (step S200). According to a result of the reading of the white reference member 113, the image reading device 10 changes (adjusts) the light quantity of the light source 102 (step S202).

In the adjustment of the light quantity, the light source 102 is set so that the light quantity is at its maximum within a range where output of the photoelectric conversion element 40 is not saturated. Furthermore, the adjustment of the light quantity doubles as a function of correcting variation in the light quantity due to an individual difference of the light source 102, an environment (temperature etc.), and time degradation, etc. For example, the image reading device 10 reads the white reference member 113 with the default quantity of light, and calculates a coefficient by comparing an output value of the photoelectric conversion element 40 with a target value, and then changes the light quantity of the light source 102. Methods for changing the light quantity include, for example, a method of changing the DC level of drive current of the light source 102 and a method of changing the pulse width by PWM dimming.

Next, the image reading device 10 reads the white reference board (the white reference member 113) (step S204). According to a result of the reading of the white reference member 113, the image reading device 10 causes, for example, the signal processing unit 42 to change (adjust) the gain (step S206). In the gain adjustment, for example, the maximum gain is set within a range not exceeding a dynamic range of an ADC of the signal processing unit 42. The image reading device 10 reads the white reference member 113 with the default gain, and calculates the gain by comparing an output value of the photoelectric conversion element 40 with a target value, and then sets the calculated gain.

Then, the image reading device 10 stores the adjusted value in a non-volatile memory such as an NVRAM of the memory 52 (step S208). Incidentally, the image reading device 10 can perform a noise correction and a black offset adjustment, etc. in addition to the adjustment of the light quantity of the light source and the gain adjustment.

Figure 6:
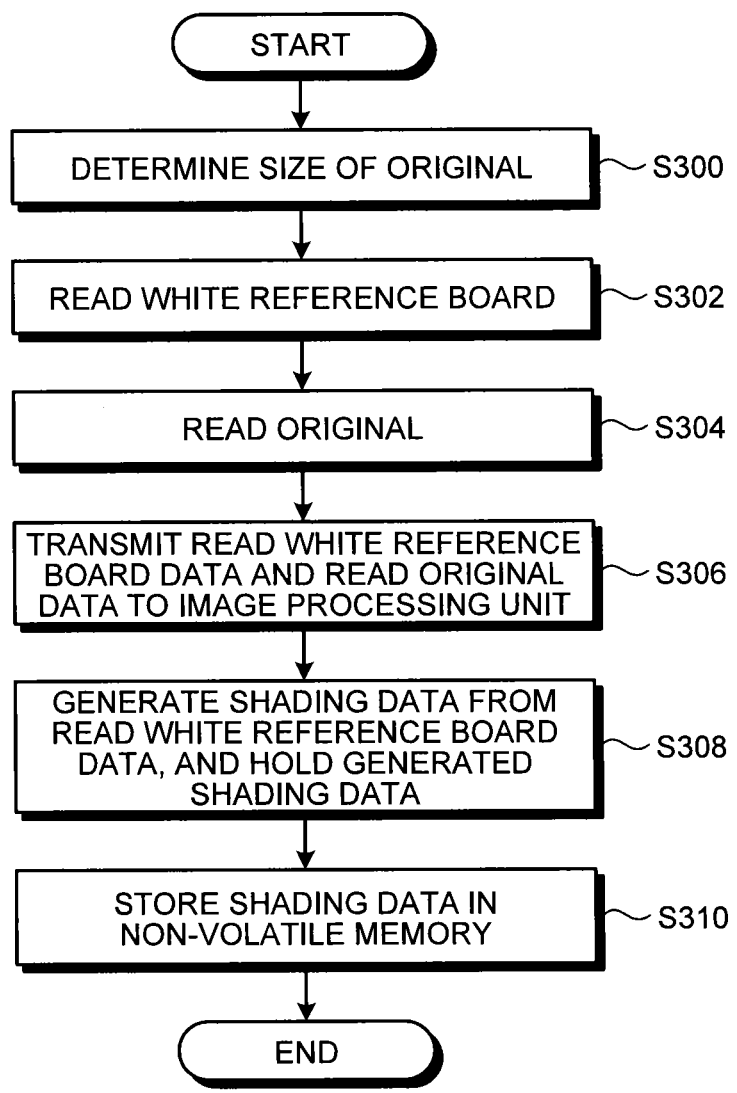
FIG. 6 is a flowchart showing a first example of scanning operation.

FIG. 6 is a flowchart showing a first example of scanning operation of the image reading device 10. When the image reading device 10 performs scanning (image reading), first, the image reading device 10 determines the size of an original from a result of the last detection of the original size or user's designation of the original size (step S300).

Next, the image reading device 10 reads the white reference member 113 (step S302) and then reads the original (step S304), and transmits respective pieces of read data (read white reference board data and read original data) to the image processing unit 5 (step S306).

The image processing unit 5 generates shading data by using the read white reference board data transmitted and holds therein the generated shading data (step S308). Furthermore, the image processing unit 5 stores the shading data in the non-volatile memory of the memory 52 so as to get ready for the subsequent original-size detecting process (step S310).

Then, the shading correction unit 510 performs a shading correction on the read original data by using the shading data. Incidentally, when the image reading device 10 performs sheet-through continuous scanning through the use of the ADF 120, to improve the productivity, the image reading device 10 may perform the reading of the white reference member 113 not always, but intermittently.

Figure 7:
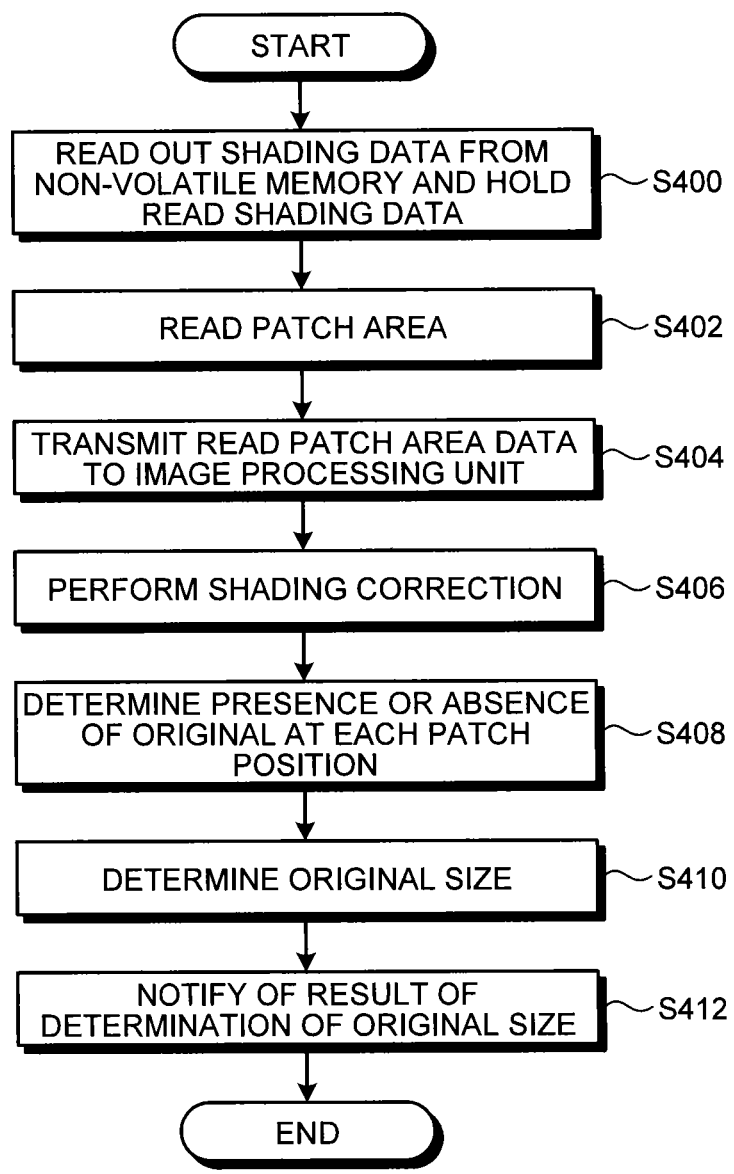
FIG. 7 is a flowchart showing a first example of an original-size detecting process.

FIG. 7 is a flowchart showing a first example of the original-size detecting process performed by the image reading device 10. For example, immediately after the return from the energy saving, the image reading device 10 performs the first example of the original-size detecting process. The image reading device 10 reads out shading data from the non-volatile memory of the memory 52 and holds therein the read shading data (step S400).

Figure 8:
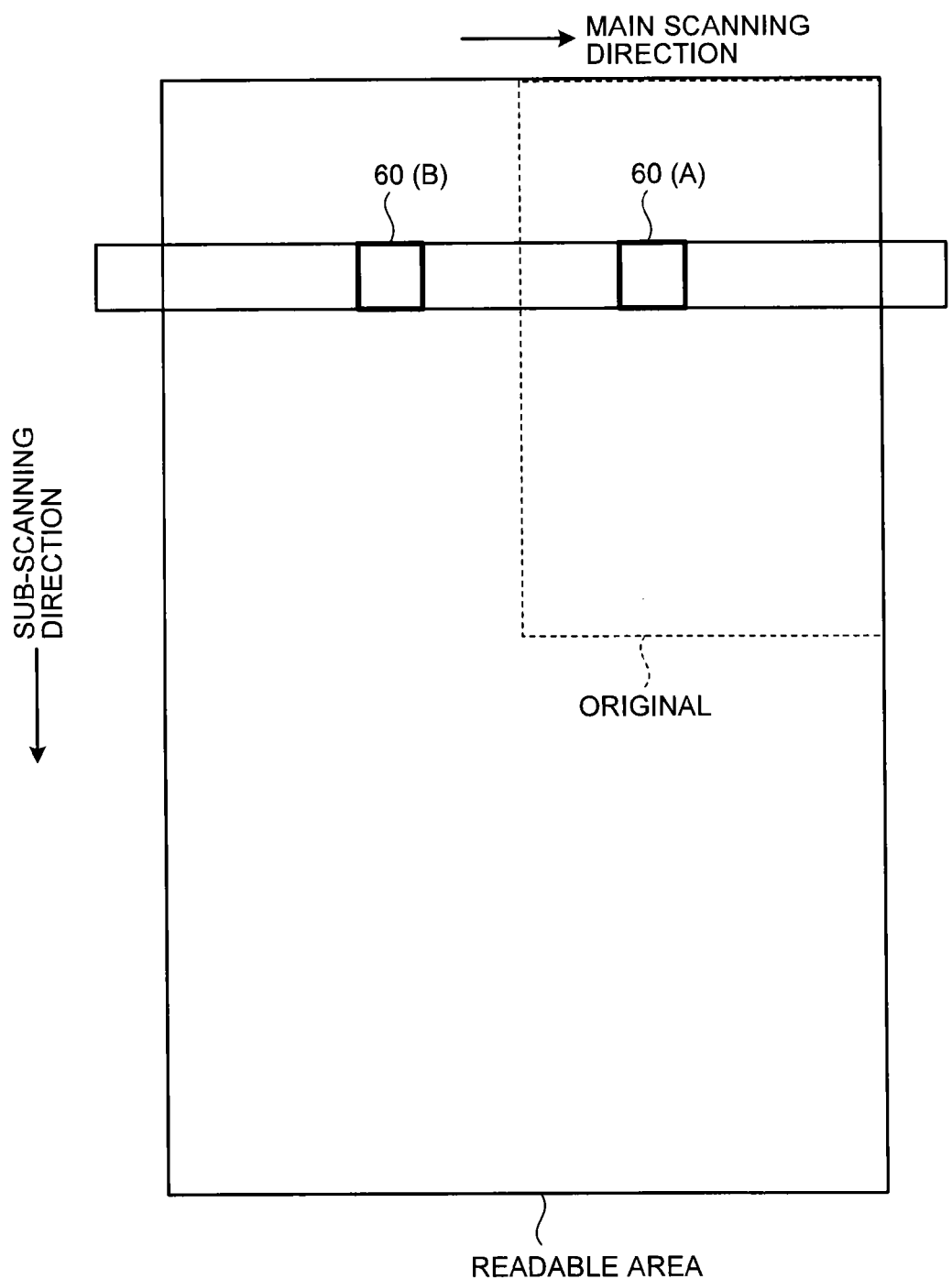
FIG. 8 is a diagram showing the location of a patch area.

Next, the image reading device 10 pre-scans and reads a patch area 60 located at a predetermined position in an original area (a readable area) shown in FIG. 8 (step S402). The image reading device 10 transmits read patch area data to the image processing unit 5 (step S404), and the image processing unit 5 performs a shading correction (step S406).

After that, the image reading device 10 determines the presence or absence of an original at each patch position by comparing the pre-scanned/read data with a predetermined threshold (step S408), determines the original size (step S410), and notifies a given destination of a result of the determination of the original size (step S412).

For example, as shown in FIG. 8, with respect to two patch areas of Patch A and Patch B, when there is an original on the Patch A and there is no original on the Patch B, the determining unit 508 determines that the border of an original is located between the Patch A and the Patch B, and determines the size of the original.

Conventionally, a large-capacity non-volatile memory used to be necessary to store all shading data. Furthermore, conventionally, it used to take a long time to read shading data because all the shading data was read out from the non-volatile memory. Especially, in the return from the energy saving (energy-saving mode), quick return is preferable; if detection of the original size failed due to delay in preparation for detection of the original size, which makes a significant impact. For example, when a user has issued an instruction to execute scanning, and detection of the original size failed to be performed, even though the user thought it would have been performed, the scanning cannot be executed properly, and it is necessary to again detect the original size or specify the original size.

Subsequently, a second example of the scanning operation and a second example of the original-size detecting process performed by the image reading device 10 are explained. Incidentally, the second example of the scanning operation and the second example of the original-size detecting process are performed by of the units of the image processing unit 5 shown in FIG. 3. For example, in reading operation for detection of the original size, it is only necessary to determine the presence or absence of an original in a predetermined patch area; therefore, there is no need for rigorous normalization of a read value of each pixel by shading correction.

Figure 9:
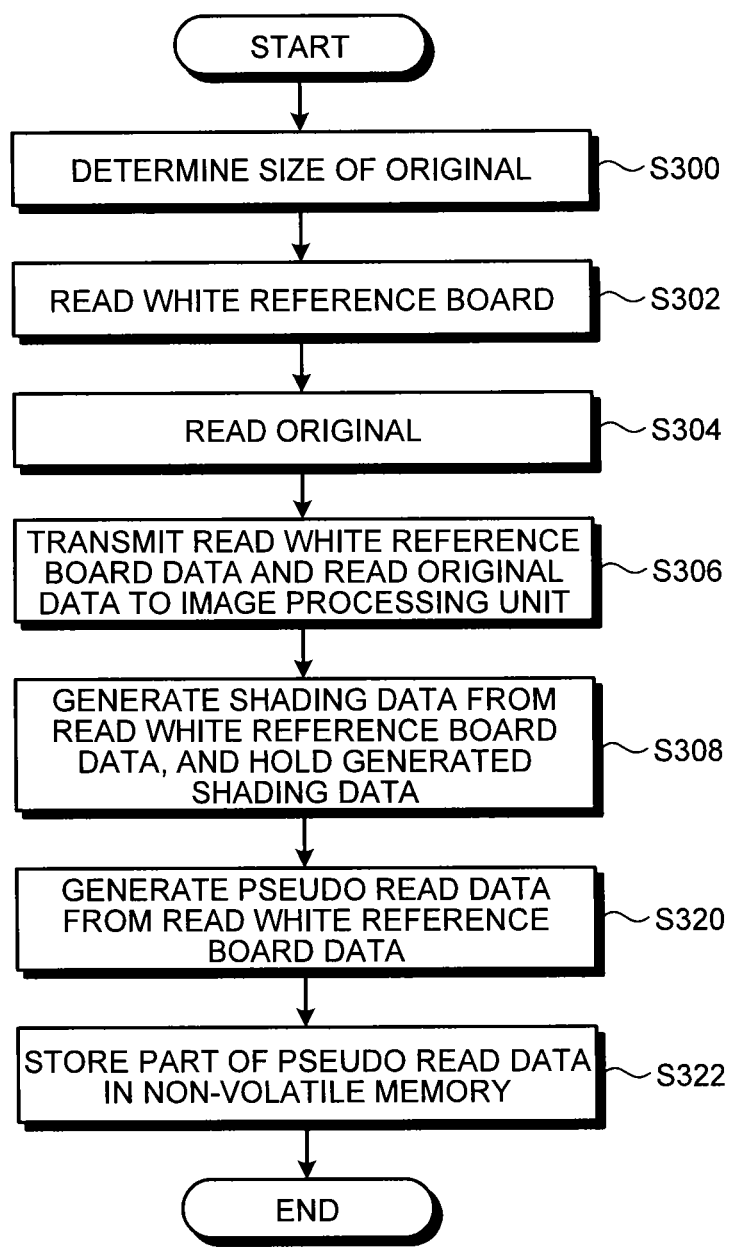
FIG. 9 is a flowchart showing a second example of the scanning operation.

FIG. 9 is a flowchart showing the second example of the scanning operation of the image reading device 10. Incidentally, out of processes shown in FIG. 9, ones substantially identical to those shown in FIG. 6 are assigned the same reference numeral. As shown in FIG. 9, at S320, the image reading device 10 causes the generating unit 500 to generate pseudo read data (pseudo data) from read white reference board data.

Then, at S322, the image reading device 10 causes the representative-value storage unit 502 stores (holds) therein a part of the pseudo read data as a representative value. The representative-value storage unit 502 can be, for example, the non-volatile memory included in the memory 52.

Figure 10:
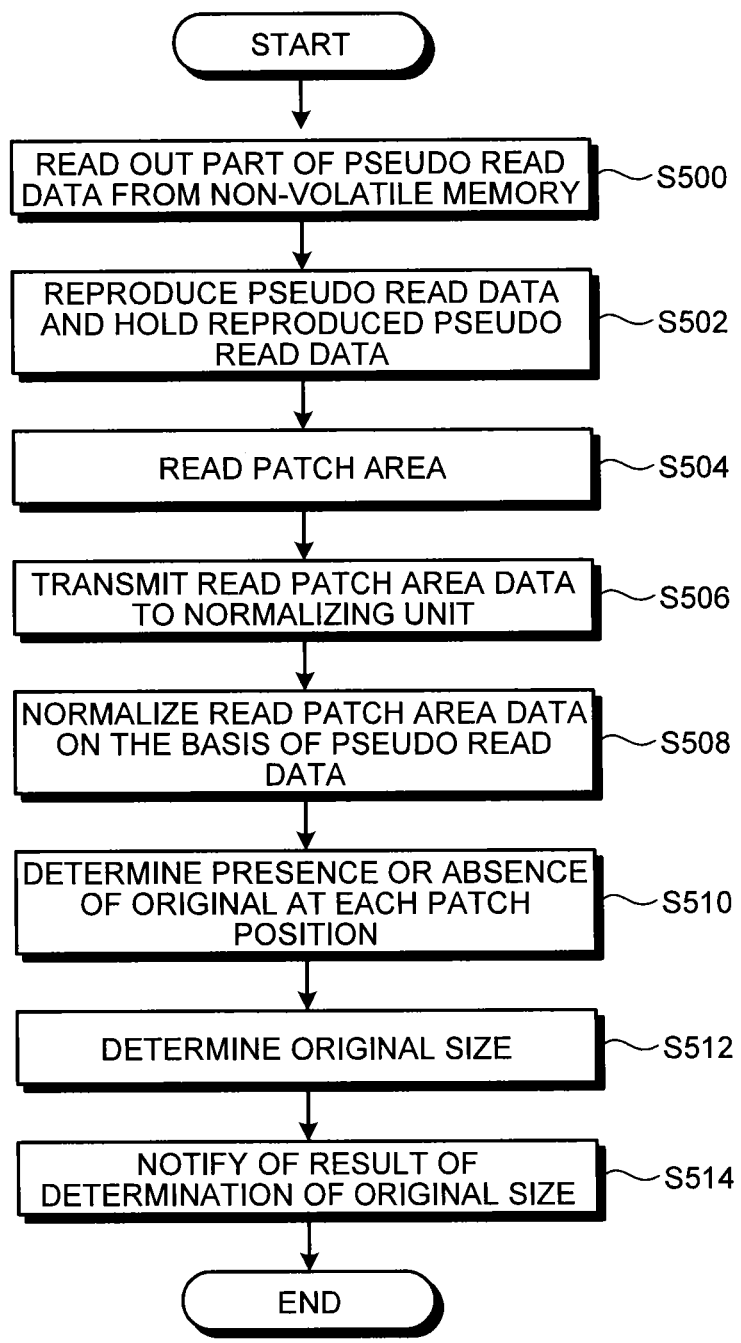
FIG. 10 is a flowchart showing a second example of the original-size detecting process.

FIG. 10 is a flowchart showing the second example of the original-size detecting process performed by the image reading device 10. For example, immediately after the return from the energy saving, the image reading device 10 performs the second example of the original-size detecting process. The image reading device 10 causes the reproducing unit 504 to read out a part of pseudo read data (a representative value) from the non-volatile memory of the memory 52 (the representative-value storage unit 502) (step S500).

Next, the image reading device 10 causes the reproducing unit 504 to reproduce pseudo read data from the representative value and hold the reproduced pseudo read data (step S502).

Next, the image reading device 10 pre-scans and reads the patch area 60 located at the predetermined position in the original area (the readable area) shown in FIG. 8 (step S504). The image reading device 10 transmits read patch area data to the normalizing unit 506 (step S506), and the normalizing unit 506 normalizes the read patch area data on the basis of the pseudo read data (step S508). Incidentally, the normalizing unit 506 can perform the normalization by correcting the pseudo read data using the read patch area data.

After that, the image reading device 10 determines the presence or absence of an original at each patch position by comparing the pre-scanned/read data with the predetermined threshold (step S510), determines the original size (step S512), and notifies a given destination of a result of the determination of the original size (step S514).

Incidentally, once data has been read out from a non-volatile memory, the data only has to be held in a volatile memory unless the power is turned off, so that there is no need to read out the data from the non-volatile memory each time detection of the original size is performed.

Figure 11:
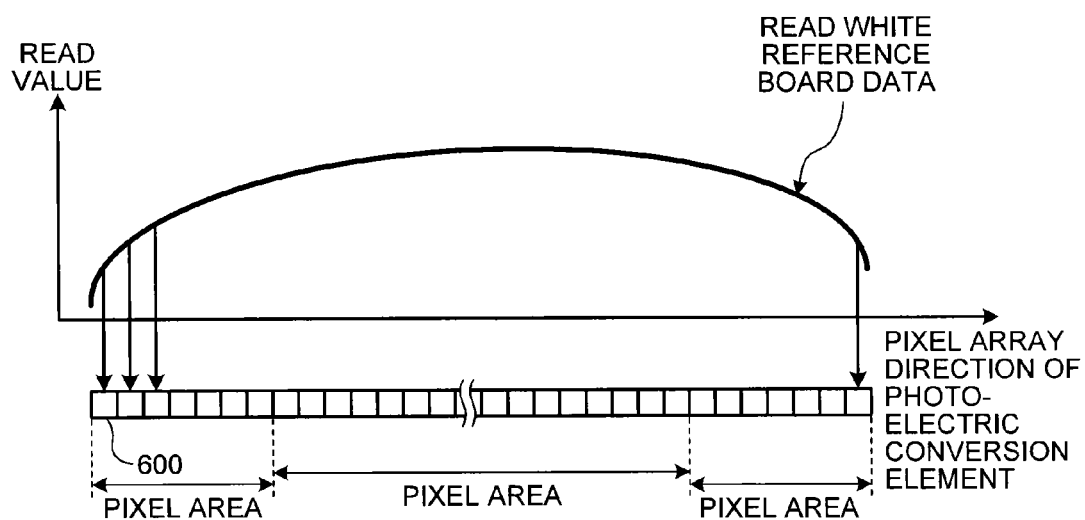
FIG. 11 is a diagram showing the capacity required to store all read white reference board data out from all pixels.

FIG. 11 is a diagram showing the capacity (the number of memories 600) required to store all read white reference board data out from all pixels. In FIG. 11, the horizontal axis indicates a pixel array direction of the photoelectric conversion element 40, and the vertical axis indicates a read white reference board value. When all shading data of an original area (a readable area in the main scanning direction) is stored in the non-volatile memory in a conventional way, pixel-by-pixel data of the photoelectric conversion element 40 is stored in the non-volatile memory. For example, when an A-3 size original is read at 600 dpi, data for about 7000 pixels is stored in the non-volatile memory.

Figure 12:
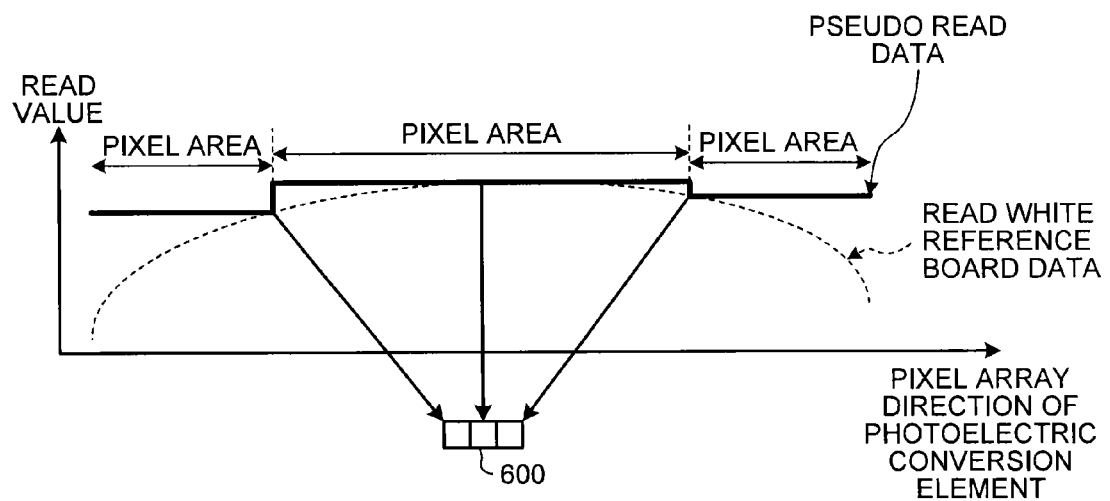
FIG. 12 is a diagram showing the capacity required for a representative-value storage unit to store a representative value of read white reference board data for each pixel area.

FIG. 12 is a diagram showing the capacity (the number of memories 600) required for the representative-value storage unit 502 to store a representative value of read white reference board data for each pixel area. When the representative-value storage unit 502 stores therein a representative value of pseudo read data, the image processing unit 5 does not have to store all read white reference board data out from all pixels. That is, the representative-value storage unit 502 stores therein only a part of pseudo read data generated from read white reference board data; therefore, it is possible to minimize the memory capacity required.

For example, when an original area (a readable area in the main scanning direction) is divided into three pixel areas as shown in FIG. 12, the representative-value storage unit 502 stores therein only respective representative values (for example, respective maximum values) of the three pixel areas. In this case, when the original-size detecting process is performed, the reproducing unit 504 reads out these three values and reproduces pseudo read data.

Therefore, the image reading device 10 can suppress the capacity of the non-volatile memory considerably, and also can suppress the time required to read out data from the non-volatile memory, especially, immediately after the return from the energy-saving mode.

Subsequently, a third example of the scanning operation and a third example of the original-size detecting process performed by the image reading device 10 are explained. In the third example of the scanning operation and the third example of the original-size detecting process, there shall be one pixel area. That is, here, an original area (a readable area in the main scanning direction) is not divided into several areas, and one representative value is obtained (i.e., a value of pseudo read data is uniform over the whole area of the original area).

Figure 13:
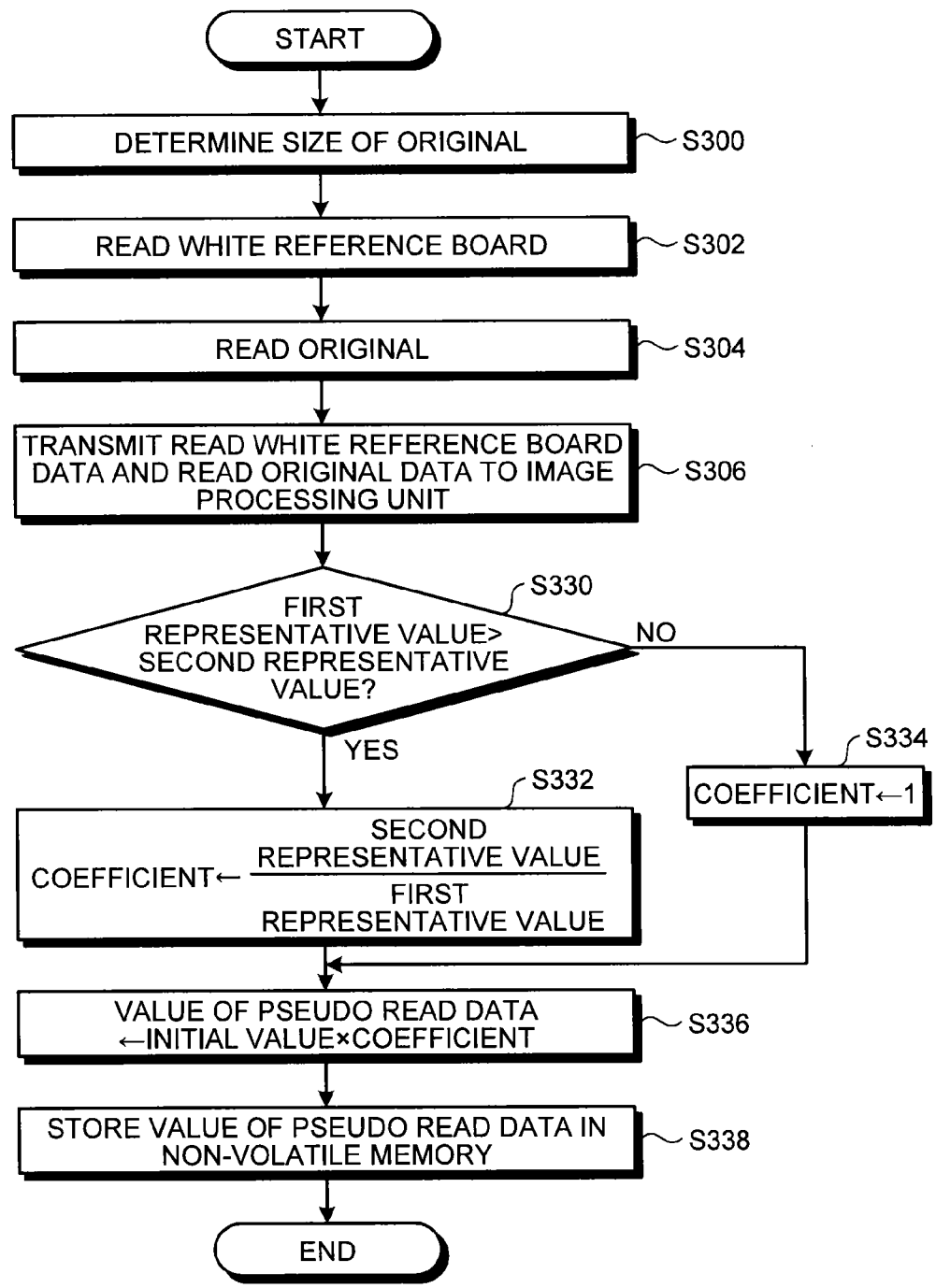
FIG. 13 is a flowchart showing a third example of the scanning operation.

FIG. 13 is a flowchart showing the third example of the scanning operation of the image reading device 10. Incidentally, out of processes shown in FIG. 13, ones substantially identical to those shown in FIG. 6 are assigned the same reference numeral.

As shown in FIG. 13, at step S330, the image reading device 10 determines whether or not a first representative value is greater than a second representative value. Here, the first representative value is assumed to be a representative value (the maximum value, in this example) of read white reference board data at the time of automatic adjustment. Furthermore, the second representative value is assumed to be a representative value (the maximum value, in this example) of read white reference board data at the time of scanning.

When the first representative value is greater than the second representative value (YES at step S330), the image processing unit 5 calculates, for example, the ratio of the second representative value to the first representative value and sets a result of the calculation as a coefficient (step S332). When the first representative value is greater than the second representative value, the light quantity is estimated to be reduced at the time of scanning. That is, as the coefficient becomes small, the image processing unit 5 corrects the reduction in the light quantity.

On the other hand, when the first representative value is not greater than the second representative value (NO at step S330), the image processing unit 5 sets the coefficient to "1" without correcting an increase in the light quantity (step S334). When the first representative value is not greater than the second representative value, the increase in the light quantity is estimated. This is because the simple maximum value detection is performed, so a risk of an erroneous estimate of variation in the light quantity is taken into consideration. If an increase in the light quantity has erroneously been estimated in spite of no actual increase in the light quantity and a read patch value has decreased, there is a risk of erroneous determination that there is no original in a patch area even though an original is present in the patch area, so the upper limit of the coefficient is set to "1". This upper limit of the coefficient is not limited to "1", and there can be no upper limit on the coefficient. In the case of erroneous determination that an original is present in a patch area with no original, this is due to the effect of ambient light etc., so even if it is overcorrected, the risk of erroneous determination is low; however, the lower limit can be set on the coefficient as well.

The image processing unit 5 multiplies the calculated ratio (the coefficient) by a predetermined reference value (an initial value) and sets the obtained value as a value of pseudo read data (step S336). Furthermore, the image processing unit 5 can perform not only the simple ratio calculation but also a calculation for adjusting the black offset, or can multiply the calculated ratio by a predetermined reference value (an initial value). Moreover, instead of multiplying the calculated ratio by the initial value, the image processing unit 5 can add or subtract a difference between the first representative value and the second representative value to/from the initial value. Accordingly, it is possible to correct short-term variation in the light quantity of the light source 102 from the gain adjustment up to the present time.

Furthermore, instead of a uniform value, pseudo read data can be obtained in such a manner that data approximate to read white reference board data is saved at the manufacture of the image reading device 10, and the data can be multiplied by the above-described ratio. Moreover, appropriate pseudo read data can be set with respect to each patch area, and dummy data can be set in an area other than the patch areas. Furthermore, each representative value can be set uniformly within a predetermined patch area. Moreover, a pixel area can be the same area as a patch area. Read data of the area other than the predetermined patch area is read data which does not contribute to detection of the original size, and therefore can be normalized with the dummy data.

The image processing unit 5 stores a value of the pseudo read data in the non-volatile memory of the memory 52 (step S338).

Figure 14:
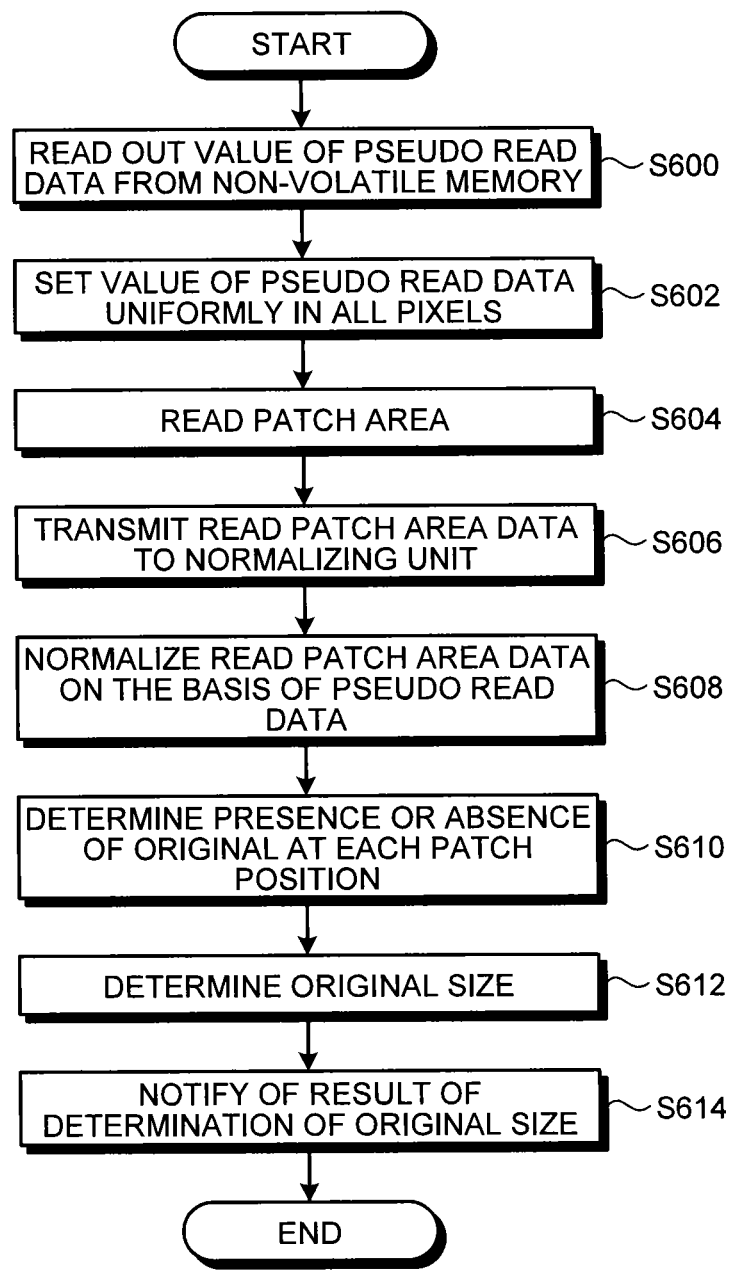
FIG. 14 is a flowchart showing a third example of the original-size detecting process.

FIG. 14 is a flowchart showing the third example of the original-size detecting process performed by the image reading device 10. For example, immediately after the return from the energy saving, the image reading device 10 performs the third example of the original-size detecting process. The image reading device 10 causes the reproducing unit 504 to read out a part of pseudo read data (a representative value) from the non-volatile memory of the memory 52 (the representative-value storage unit 502) (step S600).

Next, the image reading device 10 causes the reproducing unit 504 to reproduce pseudo read data from the representative value and hold the reproduced pseudo read data (step S602). Specifically, as there is one pixel area (one representative value), the reproducing unit 504 sets a value of the pseudo read data uniformly in all pixels.

Next, the image reading device 10 pre-scans and reads the patch area 60 located at the predetermined position in the original area (the readable area) shown in FIG. 8 (step S604). The image reading device 10 transmits read patch area data to the normalizing unit 506 (step S606), and the normalizing unit 506 normalizes the read patch area data on the basis of the pseudo read data (step S608).

After that, the image reading device 10 determines the presence or absence of an original at each patch position by comparing the pre-scanned/read data with the predetermined threshold (step S610), determines the original size (step S612), and notifies a given destination of a result of the determination of the original size (step S614).

Subsequently, a fourth example of the original-size detecting process performed by the image reading device 10 is explained. When the image reading device 10 can hold therein shading data after having finished scanning, the image reading device 10 performs a shading correction by using the shading data, thereby, also in detection of the original size, the image reading device 10 can perform the detection of the original size with accuracy; therefore, it is not necessary to perform the normalization process based on the pseudo read data.

Figure 15:
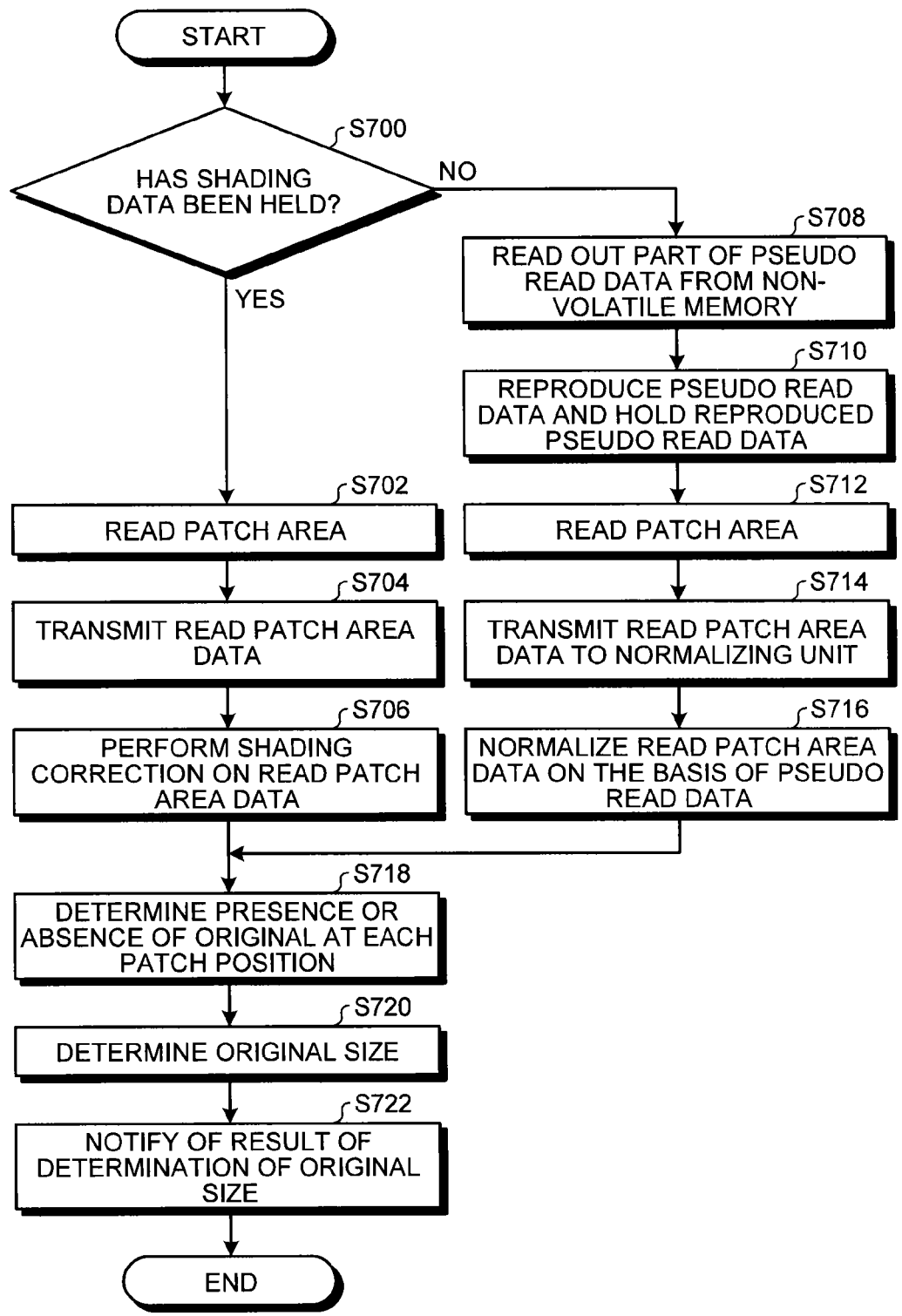
FIG. 15 is a flowchart showing a fourth example of the original-size detecting process.

FIG. 15 is a flowchart showing the fourth example of the original-size detecting process performed by the image reading device 10. For example, immediately after the return from the energy saving, the image reading device 10 performs the fourth example of the original-size detecting process. The image reading device 10 determines whether shading data has been held therein (step S700). When shading data has been held (YES at step S700), the image reading device 10 goes on to a process at S702. On the other hand, when shading data has not been held (NO at step S700), the image reading device 10 goes on to a process at step S708.

Next, the image reading device 10 pre-scans and reads the patch area 60 located at the predetermined position in the original area (the readable area) shown in FIG. 8 (step S702). The image reading device 10 transmits read patch area data (step S704), and the image processing unit 5 performs a shading correction on the read patch area data (step S706).

The image reading device 10 causes the reproducing unit 504 to read out a part of pseudo read data (a representative value) from the non-volatile memory of the memory 52 (the representative-value storage unit 502) (step S708).

Next, the image reading device 10 causes the reproducing unit 504 to reproduce pseudo read data from the representative value and hold the reproduced pseudo read data (step S710).

Next, the image reading device 10 pre-scans and reads the patch area 60 located at the predetermined position in the original area (the readable area) shown in FIG. 8 (step S712). The image reading device 10 transmits read patch area data to the normalizing unit 506 (step S714), and the normalizing unit 506 normalizes the read patch area data on the basis of the pseudo read data (step S716).

The image reading device 10 determines the presence or absence of an original at each patch position by comparing the pre-scanned/read data with the predetermined threshold (step S718), determines the original size (step S720), and notifies a given destination of a result of the determination of the original size (step S722).

Figure 16:
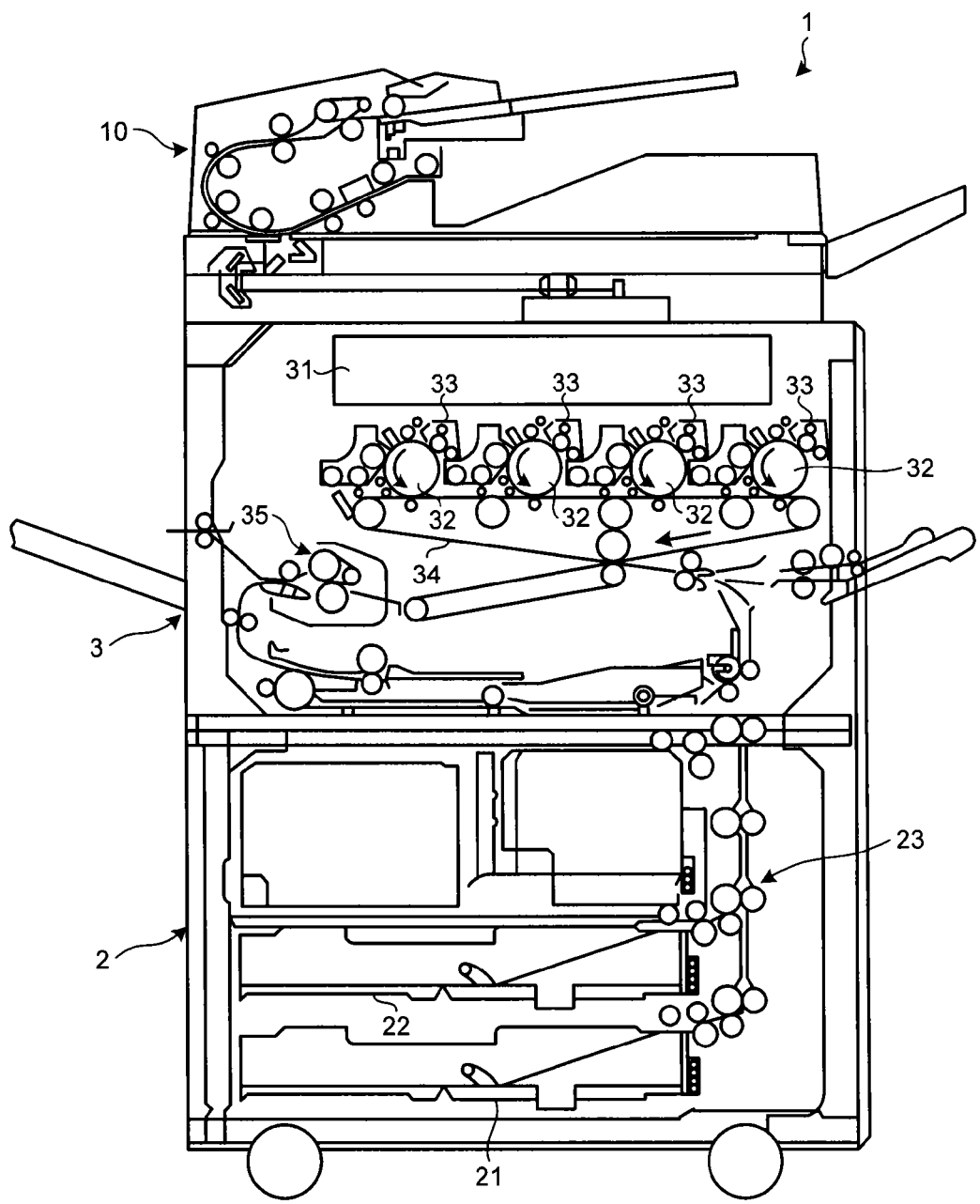
FIG. 16 is a diagram showing a configuration of an image forming apparatus.

Subsequently, an image forming apparatus 1 including the image reading device 10 is explained. FIG. 16 is a diagram showing a configuration of the image forming apparatus 1. The image forming apparatus 1 includes the image reading device 10, a sheet feeding unit 2, and an image forming unit 3.

The sheet feeding unit 2 includes sheet cassettes 21 and 22 and a sheet feeding means 23; the sheet cassettes 21 and 22 contain different sheet sizes of recording media, and the sheet feeding means 23 is composed of various rollers for conveying recording media contained in the sheet cassettes 21 and 22 to an image forming position of the image forming unit 3.

The image forming unit 3 includes an exposure device 31, photoconductor drums 32, developing devices 33, a transfer belt 34, and a fixing device 35. On the basis of image data of an original read by the image reading device 10, the image forming unit 3 causes the exposure device 31 to expose the photoconductor drums 32 to light, thereby forming latent images on the photoconductor drums 32, and causes the developing devices 33 to supply different colors of toners to the photoconductor drums 32, thereby developing the latent images into toner images, respectively. Then, after the image forming unit 3 sequentially transfers the toner images on the photoconductor drums 32 onto a recording medium supplied from the sheet feeding unit 2 through the use of the transfer belt 34, the image forming unit 3 causes the fixing device 35 to melt and fix the toners of the toner images transferred onto the recording medium in a superimposed manner, thereby forming a color image on the recording medium.

According to the present invention, it is possible to improve the accuracy of detecting the original size while decreasing the storage capacity required for detection of the original size thereby reducing the readout time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
   a photoelectric conversion element that includes a plurality of pixels arranged in a main scanning direction, and photoelectrically converts a reflected light of a light emitted from a light source with respect to each pixel into an electrical signal to be treated as read data;
   a white reference member reflects the light emitted from the light source as a criterion for correcting a result of photoelectric conversion of each pixel;
   a generating unit that generates pseudo data, which is a substitute for the criterion for correcting respective results of photoelectric conversion of the plurality of pixels, on a basis of the light reflected by the white reference member with respect to each pixel area composed of a predetermined number of pixels out of the plurality of pixels;
   a representative-value storage unit that stores therein a representative value of each pixel area of the pseudo data generated by the generating unit;
   a reproducing unit that reproduces the pseudo data on a basis of the representative values stored in the representative-value storage unit;
   a normalizing unit that normalizes results of photoelectric conversion of at least any of pixels that have received the light reflected by the white reference member on a basis of the pseudo data reproduced by the reproducing unit, thereby creating a criterion for determining the presence or absence of an original; and
   a determining unit that determines a size of the original by detecting the presence or absence of an original at a predetermined position on a basis of the determining criterion.

2. The image reading device according to claim 1, wherein the representative-value storage unit stores the representative value in a non-volatile area before power has been turned off, and the reproducing unit reproduces the pseudo data after the power has been turned on.

3. The image reading device according to claim 1, further comprising:
a signal processing unit that performs at least any processing of amplification, black-level correction, and analog-to-digital conversion on output of the photoelectric conversion element;
an adjustment unit that makes adjustment in the processing performed by the signal processing unit on the basis of the light reflected by the white reference member after the power has been turned on;
a shading correction unit that performs a shading correction on read original data on the basis of a result of the processing by the signal processing unit after the adjustment unit has made adjustment; and
a correcting unit that corrects the representative value stored in the representative-value storage unit on the basis of a result of a shading correction last performed by the shading correction unit.

4. The image reading device according to claim 3, wherein the correcting unit corrects a representative value to be newly stored in the representative-value storage unit on the basis of the ratio of the representative value which has already been stored in the representative-value storage unit to a representative value of the last read data of the white reference member.

5. The image reading device according to claim 4, wherein the correcting unit does not correct the representative value stored in the representative-value storage unit when the ratio is equal to or more than a predetermined value or when the ratio is equal to or less than a predetermined value.

6. The image reading device according to claim 1, wherein the representative value of each pixel area of the pseudo data is a maximum value of each pixel area of the pseudo data.

7. The image reading device according to claim 1, wherein a number of pixel areas is one.

8. The image reading device according to claim 1, wherein the representative-value storage unit has stored therein a predetermined initial value at a beginning.

9. The image reading device according to claim 1, wherein the determining unit determines the size of the original on a basis of reflected lights from patch areas composed of the predetermined number of pixels at predetermined one or more positions.

10. The image reading device according to claim 9, wherein the pixel area is the same area as the patch area.

11. The image reading device according to claim 1, wherein
when the results of photoelectric conversion of the plurality of pixels with respect to the light reflected by the white reference member have been stored, the determining unit determines the size of the original on a basis of the results of photoelectric conversion of the plurality of pixels instead of the determining criterion.

12. An image forming apparatus comprising:
the image reading device according to claim 1; and
an image forming unit that forms an image read by the image reading device on a recording medium.

13. An image reading method comprising:
photoelectrically converting a reflected light of a light emitted from a light source with respect to each pixel into an electrical signal to be treated as read data by a photoelectric conversion element including a plurality of pixels arranged in a main scanning direction;
generating pseudo data, which is a substitute for a criterion for correcting respective results of photoelectric conversion of the plurality of pixels, on a basis of a light reflected by a white reference member, which reflects the light emitted from the light source as a criterion for correcting a result of photoelectric conversion of each pixel, with respect to each pixel area composed of a predetermined number of pixels out of the plurality of pixels;
storing a representative value of each pixel area of the generated pseudo data;
reproducing the pseudo data on a basis of the stored representative values;
normalizing results of photoelectric conversion of at least any of pixels that have received the light reflected by the white reference member on a basis of the reproduced pseudo data, thereby creating a criterion for determining the presence or absence of an original; and
determining a size of the original by detecting the presence or absence of an original at a predetermined position on a basis of the determining criterion.

* * * * *